UNITED STATES PATENT OFFICE

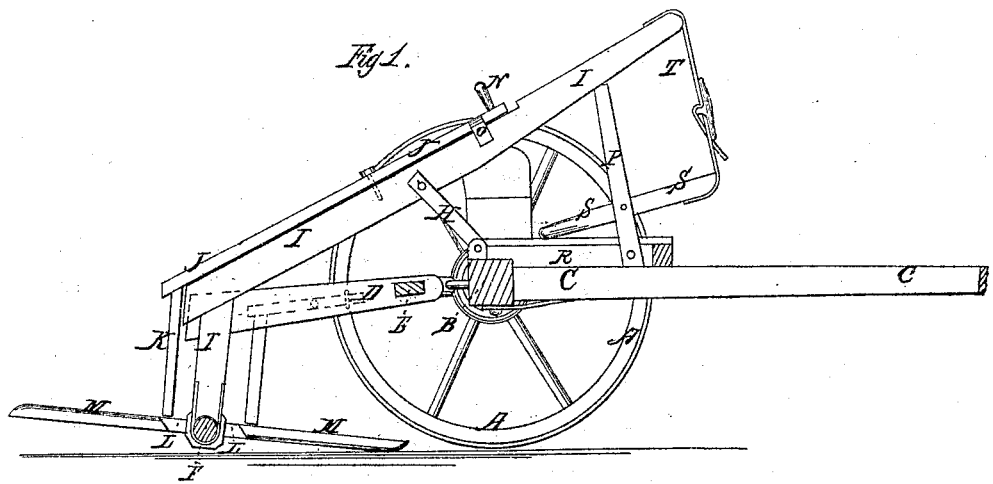
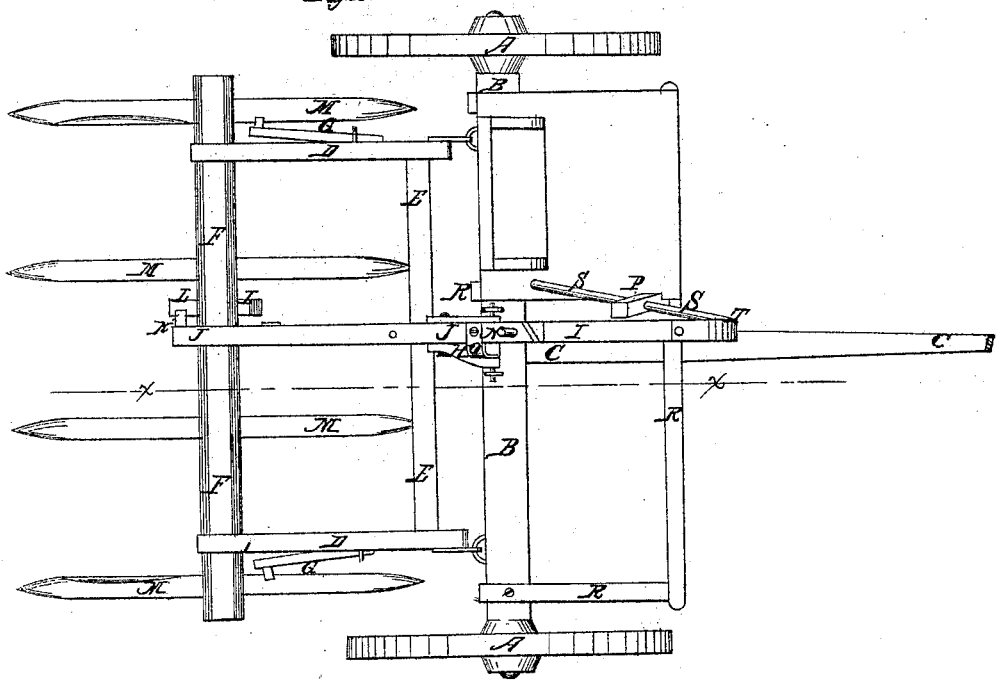

CURTIS SATTERLEE, OF PARIS, ILLINOIS.

IMPROVEMENT IN HORSE-RAKES.

Specification forming part of Letters Patent No. 59,663, dated November 13, 1866.

*To all whom it may concern:*

Be it known that I, CURTIS SATTERLEE, of Paris, in the county of Edgar and State of Illinois, have invented a new and useful Improvement in Revolving Horse Hay-Rakes; and I do hereby declare that the following is a full, clear, and exact description thereof, which will enable others skilled in the art to make and use the same, reference being had to the accompanying drawings, forming a part of this specification, in which—

Figure 1 is a vertical section of my improved rake, taken through the line *x x*, Fig. 2. Fig. 2 is a plan or top view of the same.

Similar letters of reference indicate like parts.

My invention has for its object to furnish an improved revolving hay-rake, so constructed that the rake may be operated from the driver's seat; and it consists in the combination of certain parts, as will be hereinafter more fully described.

A are the wheels; B, the axle, and C the tongue of the cart, by which the rake is drawn, and by which it is supported when lifted from the ground. D are the draft-arms, by which the rake-head is drawn forward, and which are pivoted to the rear side of the axle B, as shown in Figs. 1 and 2. These arms are connected by a cross-bar, E, to compel them to act together and to give them steadiness. The rear ends of these arms D project downward, and are connected to the rake-head shaft F by bands passing around said shaft and attached to the ends of said arms, in the usual manner.

To the sides of the arms D are attached the ends of the side springs, G, the lower ends of which rest upon the forward teeth of the rake-head and hold said rake-head steady while collecting the hay. As the rake-head revolves its teeth force the springs to one side, and the elasticity of said springs again brings them back as soon as the rake-teeth have passed them to their former position, ready to again hold the rake-head, as before described.

H is a post, the lower end of which is pivoted to the middle part of the axle B, as shown in Fig. 1. To the upper end of this post H is pivoted the lever I, the rear end of which projects down to the rake-head shaft F, and is connected by a band passing around said shaft, in the ordinary manner, as shown in Fig. 1. By drawing down the forward end of the lever I the rake-head is lifted from the ground, allowing it to revolve.

To the upper edge of the lever I is pivoted the lever J, which has an arm, K, attached to its rear end. The lower end of this arm rests upon one or the other end of the bar L, which passes through the rake-head shaft F in a line with the teeth M, as shown in Fig. 2. By this means the rake-head is kept from revolving while collecting the hay.

To the upper side of the forward end of the lever J is attached a handle, N, by which the said lever can be drawn to one side, removing the end of the arm K from the bar L, and allowing the rake-head to revolve.

O is a stop attached to the lever J, which catches upon the lever I and prevents the said lever J from being drawn aside too far. The forward end of the lever J is beveled, as shown in Fig. 2.

When the lever I is drawn down in the manner hereinafter described, this inclined end of the lever J strikes against the post P, and is thus pushed back into its former position, ready to take hold of the bar L when the revolution of the rake-head has again brought it into proper position.

The lower end of the post P is attached to the frame R of the cart, and to it is pivoted the lever S, as shown in Fig. 1. The rear end of this lever is in such a position as to be reached and operated by the driver from his seat.

The forward end of the lever S is connected to the forward end of the lever I by a strap, T, which is provided with a buckle, so that it may be made shorter or longer, as may be required.

In using the rake, when the driver wishes to deposit the collected hay in a windrow, he draws the forward end of the lever J toward him by means of the handle N. This frees the bar L from the lever J K. Then, by raising the rear end of the lever S, he draws down the forward end of the lever I. This lifts the shaft F of the rake-head, and the forward movement of the rake and the weight of the hay causes the forward teeth of the rake to catch upon the ground and revolve the rake-head. The revolution of the rake-head causes the levers I and J to pitch forward and downward. This brings the inclined forward end of the lever J against the post P, and brings the lever J and arm K into position to take hold of the bar L and hold the rake-head when the revolution is completed.

What I claim as new, and desire to secure by Letters Patent, is—

The combination of the pivoted lever J, with its arm K, pivoted lever I, rake-head shaft F, and bar L, strap T, lever S, and post P, constructed as described, and arranged to operate substantially as and for the purpose specified.

CURTIS SATTERLEE.

Witnesses:
VIRGIL COLLINS,
OSSIAN SATTERLEE.